March 11, 1924.
L. K. SCOTFORD
SOUND BOX
Filed Feb. 1, 1919
1,486,692
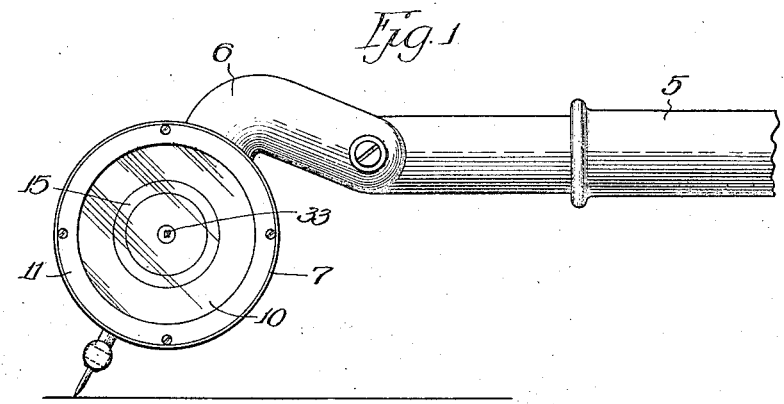
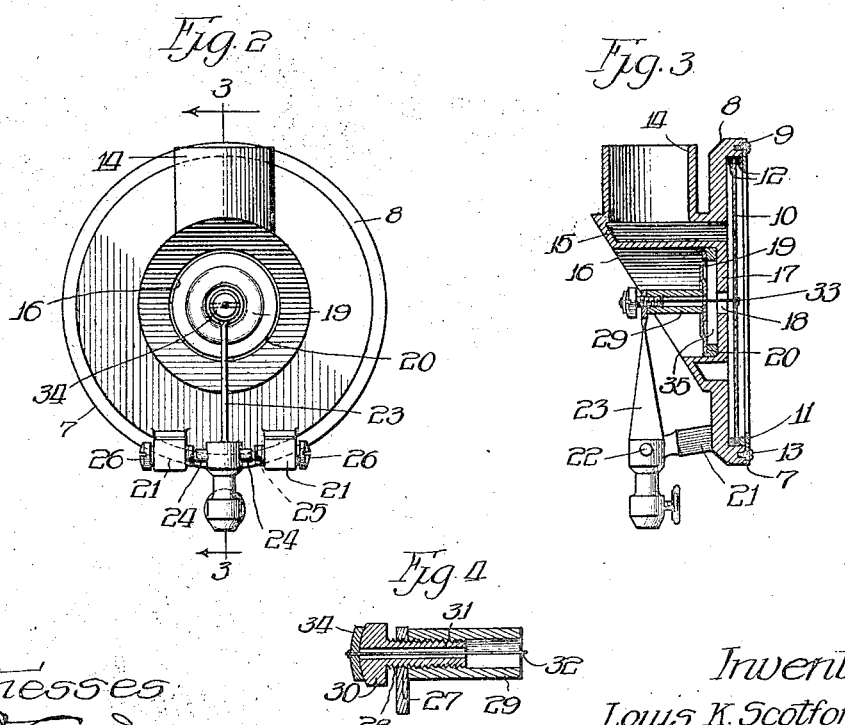
Witnesses
Fred T. Davison
R. Burkhardt
Inventor
Louis K. Scotford
By Wilkinson & Huxley
attys.

Patented Mar. 11, 1924.

1,486,692

UNITED STATES PATENT OFFICE.

LOUIS K. SCOTFORD, OF CHICAGO, ILLINOIS, ASSIGNOR TO THE ORO-TONE COMPANY, OF CHICAGO, ILLINOIS, A CORPORATION OF ILLINOIS.

SOUND BOX.

Application filed February 1, 1919. Serial No. 274,412.

*To all whom it may concern:*

Be it known that I, LOUIS K. SCOTFORD, a citizen of the United States, residing at Chicago, in the county of Cook and State of Illinois, have invented certain new and useful Improvements in Sound Boxes, of which the following is a specification.

My invention relates to sound reproducing machines and particularly to a novel sound box therefor.

In order to explain the advantages of my invention, a description of the workings of the usual sound boxes and of the action of diaphragms in particular may not be amiss. With sound boxes wherein the diaphragm is supported at its outer rim in a fairly rigid manner, such a diaphragm has a natural rate of vibration. When the diaphragm is struck or otherwise actuated, it tends to vibrate a number of times at its natural rate until it comes to rest. Experiments have shown that when an undampened diaphragm is so struck the vibrations may continue for as many as fifteen times. These vibrations are in the nature of ripples and start at the center, travel to the edge of the diaphragm and there are reflected toward the center. This inward and outward movement continues until the ripples are dissipated. The number of times, of course, depends on the energy imparted to the diaphragm in the first instance, and on the natural vibration rate of the diaphragm as determined by its diameter, thickness and structure. Where in phonographic use diaphragms are employed which are retained at the edges, the diaphragm vibrates to a certain extent at its natural rate and acts somewhat as a free diaphragm with the reflections at the center occurring as described above. It will therefore be clear that when these reflections continue more or less during playing of the record or during the recording of sound, the vibration of the diaphragm is sometimes at other than its natural rate, which results in alteration of the ripples and what may be termed a confusion of sound. This happens both in recording and reproducing sound. The ideal condition would be one in which the waves pass from the center of the diaphragm to the edge and there be absorbed. Various attempts have been made to create such a condition, but without commercial success. It has been found that if a diaphragm is not supported at its edge it is impossible for the vibrations to occur in the form of ripples, the result being that of the mass as a whole. This condition is not practicable, as the strength of the record material is insufficient to move the entire mass of the diaphragm at one time. Other attempts have been made to dampen the reflected ripples by covering the diaphragm with cork or other material, but this has resulted in loss of certain tones in reproduction, and also reduces the volume. The reflected ripples are not only harmful because of the coincidence of the waves, but also by reason of the opposition of the sound waves, as the ripples traveling outwardly encounter the ripples traveling inwardly and the same collide. Inasmuch as every ripple results in a corresponding undulation of the air in the sound box, arm and horn of the phonograph, it follows that any reflected waves or any waves which are the result of two waves existing at any instant on the diaphragm must result in undulations of a number and character which did not exist when the record was made. It is to overcome these effects that I have provided a sound box having a secondary diaphragm as an important part thereof, and which diaphragm serves as a closure for a portion of the sound chamber.

One of the objects of my invention is to reduce confusion of sound waves in sound boxes for improvement in sound recording and reproduction by providing a sound box having a plurality of diaphragms operating jointly from a common stylus bar and using a second diaphragm for the purpose of dampening the vibrations created by the first or primary diaphragm and also for the purpose of transmitting sound vibrations from the needle to the air in the sound box.

Another object is to provide a sound box having a plurality of diaphragms therein so connected to the stylus bar as to be independently deflective in opposite directions.

Another object is to provide a sound box having two opposed diaphragms with the tone arm communicating with the space between the diaphragms, and so connecting these with the stylus bar that the centers of the diaphragms will be independently moved toward each other to more effectively produce the dampening effect sought.

A further object is to provide a sound box having a plurality of diaphragms therein so associated with the stylus bar that either may have vibratory movement with respect to the other and that both may be vibrated in unison.

A still further object is to connect the end of the stylus bar with the diaphragm by a flexible member so that both hill and dale and zigzag records may be played.

A yet further object is to provide a sound box having a plurality of diaphragms of varying sizes and having connections with each other and with the stylus bar of such a nature that the connection may be varied as desired and that the movement of one diaphragm in one direction will react on the other diaphragm.

A yet further object is to improve sound boxes for successful commercial use.

Reference is directed to the drawings, wherein—

Figure 1 is an elevational view of a sound box connected to a tone arm through the usual goose neck connection, the sound box being that of the preferred form of my invention.

Figure 2 is an enlarged elevational view of the rear side of the sound box showing the various novel features thereof.

Figure 3 is a vertical sectional view on line 3—3 of Figure 2, showing the preferred arrangement of my invention, and Figure 4 is an enlarged sectional view of the preferred form of tensioning means used.

In the drawings, 5 is the sound box end of the tone arm which arm may be of any desired form or make. 6 is a goose neck connection removably connected to the sound box 7. The above features being well known in the art, I do not claim these as part of my invention.

The preferred form of my invention includes a sound box having a casing 8 with the usual enlarged flange portion 9 in which portion is inserted the diaphragm 10 held in place by means of a cover plate 11, bearing against the usual resilient gaskets 12, the plate being secured in position by means of screws 13 or the like. It is to be noted that I make the stylus connection of the diaphragm at the rear side of the diaphragm rather than at the front which is the usual practice. The reason for this will be explained hereinafter. The upper portion of the casing 8 has a conduit or coupling 14 for connection with the goose neck 6, the conduit 14 being circular in cross section. I prefer to make the sound box in the form shown in Figures 2 and 3 having an annular sound chamber 15 communicating with the conduit 14 which annular chamber varies in depths from maximum at the connection with the conduit 14 to minimum at a point diametrically opposite. The wall 16 forming the inner portion of the air chamber 15 defines a depression the bottom of which forms the back wall 17 of a portion of the air chamber behind the diaphragm 10. The wall 17 is provided with a centrally disposed opening 18 communicating with the outside of the box. Overlying the opening 18 I provide another or secondary diaphragm 19 which, in the preferred embodiment of my invention, I make slightly thinner than the diaphragm 10. This diaphragm 19 is supported on a resilient ring washer 20. Projecting rearwardly from the lower part of the casing 8 are arms 21 to which is pivoted at 22 the stylus or needle holder 23. This is made of any desired form. Preferably, the stylus 23 is mounted in the arms 21 so as to have a pivotal motion with respect thereto. This is accomplished by forming the pivot members 24 with points for cooperating with cup shaped depressions 25 in the adjusting screws 26. The upper end of the stylus bar 23 terminates in a flattened portion 27 having an aperture 28 therethrough. When assembled there is inserted between the inner face of the stylus bar and the diaphragm 19 a sleeve or tube 29, the inner end of which rests against the central portion of the diaphragm 19 and the outer portion of which is interiorly threaded for engagement by a screw 30 which screw extends through the screw-threaded aperture 28 in the end of the stylus bar 23. The screw 30 is provided with a central aperture 31 through which extends a flexible cord or member 32, secured at 33 to the center of the diaphragm 10, and at its outer end to a washer or similar member 34 which is maintained outwardly of the head of the screw 30. It will now be observed that there are formed a plurality of sound chambers the usual one between the diaphragm 10 and the rear walls of the casing 8, the annular chamber 15 in communication with the chamber behind the diaphragm 10 and the small sound chamber 35 between the diaphragm 19 and the rear wall 17. It will also be observed that these various sound chambers are in communication so that sound waves set up in one may be communicated to another, and conveniently dissipated and unified.

By means of the tensioning device, that is, the screw 30 cooperating with the threaded end portion of the sleeve 29 and the flexible member 32, the central portions of the two diaphragms may be drawn toward each other or put under tension. As one diaphragm is larger than the other the natural vibrations thereof will be different from the smaller. By connecting the stylus to the primary or larger diaphragm 10 by means of the flexible member 32, it is possible by this construction when reproducing sounds to compel the larger diaphragm 10 to come more quickly to rest than if it were rigidly fastened to the secondary diaphragm 19.

In reproducing recorded sounds the stylus is pivoted as is common practice setting up longitudinal movement through the cord 32 and transmitting same to the diaphragm 10. Because of the tension relation existing between the two diaphragms it will be noted that as the top of the stylus bar in Figure 3 is moved to the left, the cord will be drawn to the left and the sleeve 29 will move to the left, the effect being to create tension in the diaphragm 10 and release the diaphragm 19 from tension. When the top of the stylus is moved to the right, the diaphragm 19 will be put under tension and the diaphragm 10 released. By the term released, I do not mean that the diaphragm will be moved to such position as to be free from tension but what I intend to mean by this term is that it will be permitted to move toward a neutral plane although by reason of the tension imposed by the flexible member and sleeve, neither of the diaphragms 10 or 19 is permitted to move into a fully released position. With such construction it may readily be seen that the smaller diaphragm 19 serves as a dampener for the larger diaphragm 10 to permit a quick change from one tone to another transmitted to the diaphragm 10 through the needle, stylus bar and cord 32. The larger diaphragm takes care of the lower notes reproduced and the smaller one the higher notes reproduced, thus combining and unifying the resultant sound produced to one that is free from the usual confusion. With such an arrangement, the use of diaphragms having different natural vibrating rates, the vibrations are stabilized and each will stop the free vibrations of the other. Particularly is this true with respect to the stopping of the free vibrations of the larger diaphragm by the smaller. The position of the stylus bar as shown and described permits the use of a shorter and lighter connecting member between it and the smaller or secondary diaphragm 19, thereby reducing the inertia of the rigid member. It also brings the stylus bar in line with the axis of the coupling or conduit 14 so that the needle remains stationary when the sound box is turned about this axis to play "hill and dale" on lateral cut records. This permits the tone arm and attached parts to remain in the same position in either case. Furthermore, by connecting the air chambers the smaller diaphragm serves to set the air vibrations in the larger one with undulatory motion which is particularly desirable when the vibrations on the record are high, as I have found that the smaller diaphragm responds more readily to the higher rates of vibration. With such a device it is possible to secure clear articulation, more natural tones, and eliminations of the usual surface sounds. Furthermore, by reason of the novel mounting of the stylus bar, the records are subject to less wear than with the present type of stylus mounting.

It is my intention to cover all modifications of the invention falling within the spirit and scope of the following claims.

I claim:—

1. In a sound box, in combination, a main diaphragm, a secondary diaphragm, said diaphragms forming opposite walls of directly communicating sound chambers, a needle, separate means associated with each of said diaphragms and said needle for causing positive movement of one diaphragm in one direction only and positive movement of the other diaphragm in an opposite direction only.

2. In a sound box, in combination, a pair of diaphragms of different diameters, each diaphragm forming a part of a sound chamber, a wall between said diaphragms forming a common wall for said sound chambers and an aperture through said wall located centrally of the diaphragms whereby said chambers directly communicate.

3. In a sound box, in combination, a pair of diaphragms of different diameters having different rates of vibration, each diaphragm forming a wall of a sound chamber, the other wall of each chamber being a single apertured partition between said diaphragms forming a wall common to both chambers and connections between the stylus and each diaphragm whereby both diaphragms may be caused to vibrate in such manner that the vibrations of each act on the vibrations of the other for effecting the final reproduced sounds.

4. In a sound box, in combination, a pair of diaphragms of different diameters having different rates of vibration, each diaphragm forming a wall of a sound chamber, the other wall of each chamber being a single apertured partition between said diaphragms forming a wall common to both chambers and connections between the stylus and each diaphragm whereby both diaphragms may be caused to vibrate in such manner that the vibrations of each act on the vibrations of the other for effecting the final reproduced sounds, and means for influencing the connections between the stylus and diaphragms for varying the reproduced sounds.

5. In a sound box, in combination, a pair of diaphragms of different diameters having different rates of vibration, each diaphragm forming a wall of a sound chamber, the other wall of each chamber being a single apertured partition betwen said diaphragms forming a wall common to both chambers and connections between the stylus and each diaphragm whereby both diaphragms may be caused to vibrate in such manner that the vibrations of each act on the vibrations of the other for effecting the final reproduced sounds, said connection permitting relative movement of one diaphragm in one direction and positive movement of the diaphragm in the opposite direction.

6. In a sound box, in combination, a pair of diaphragms, a stylus, and connections in axial alignment therebetween, said connections including a flexible member connecting to one of said diaphragms, a hollow tube connecting said stylus to the other of said diaphragms and surrounding said flexible member.

7. In a sound box, in combination, a pair of diaphragms mounted one in front of the other, a stylus, a hollow tube connecting said stylus with the nearer diaphragm, and a flexible member in axial alignment with said tube connecting said stylus with the other diaphragm and passing through said hollow tube.

8. In a sound box, in combination, a pair of diaphragms mounted one in front of the other, a stylus, a hollow tube connecting said stylus with the nearer diaphragm, a flexible member connecting said stylus and the other diaphragm and passing through said hollow tube, and means for relatively adjusting said flexible member and tube.

9. In a sound box, in combination, a pair of diaphragms mounted one in front of the other, a stylus, a hollow tube connecting said stylus with the nearer diaphragm, a flexible member connecting said stylus and the other diaphragm and passing through said hollow tube, and means associated with said tube for tensioning said flexible member.

10. In a sound box, in combination, a plurality of diaphragms, a stylus, connections between said stylus and said diaphragms, one of said connections being a flexible member, another being a sleeve arranged to serve as a protection for said flexible member, and means for varying the relation between said flexible member and said sleeve.

11. In a sound box, in combination, a casing adapted to contain a plurality of diaphragms arranged in spaced relation and having a common sound chamber with which a tone arm communicates, and connections therebetween adapted to cause the vibration of one diaphragm to dampen the vibration of another diaphragm.

12. In a sound box, in combination, a casing adapted to contain a plurality of diaphragms in spaced relation, means connecting said diaphragms to cause tension differences therebetween, said means including a flexible connector and a rigid connector.

13. In a sound box, in combination, a casing adapted to contain a plurality of diaphragms of different rates of natural vibrations, said diaphragms arranged to deliver the vibrations thereof in a common sound chamber with which a tone arm communicates whereby the sound waves created by one diaphragm set up undulatory motion in the sound chamber.

14. A sound box having an annular sound chamber at the rear of the diaphragm therein, said chamber being in communication with the tone arm connection, said chamber varying in depth to the maximum at the tone arm connection.

15. A sound box casing having an annular chamber of varying depth formed at the back thereof, the intermediate portion of said back serving as a part of the rear wall of the main sound chamber, said wall having a centrally disposed aperture therethrough, a diaphragm mounted in said casing forming the front wall of the main sound chamber, and another diaphragm mounted exteriorly of said casing overlying the central aperture in the rear wall and within the space defined by the annular chamber.

16. A sound box casing having an annular chamber of varying depth formed at the back thereof, the intermediate portion of said back serving as a part of the rear wall of the main second chamber, said wall having a centrally disposed aperture therethrough, a diaphragm mounted in said casing forming the front wall of the main sound chamber, another diaphragm mounted exteriorly of said casing overlying the central aperture in the rear wall and within the space defined by the annular chamber, a stylus carried by said casing, and means connecting said stylus and first diaphragm, said means passing through the second diaphragm and through the apertured rear wall of the sound box.

17. A sound box casing having an annular chamber of varying depth formed at the back thereof, the intermediate portion of said back serving as a part of the rear wall of the main sound chamber, said wall having a centrally disposed aperture therethrough, a diaphragm mounted in said casing forming the front wall of the main sound chamber, another diaphragm mounted exteriorly of said casing overlying the central aperture in the rear wall and within the space defined by the annular chamber, a stylus carried by said casing, and means operatively connecting said stylus and said second diaphragm.

Signed at Chicago, Illinois, this 25th day of January, 1919.

LOUIS K. SCOTFORD.